United States Patent
Bae et al.

(10) Patent No.: US 9,666,842 B2
(45) Date of Patent: May 30, 2017

(54) RECHARGEABLE BATTERY PACK

(71) Applicant: Samsung SDI Co., Ltd., Yongin-si, Gyeonggi-do (KR)

(72) Inventors: Sang-Hoon Bae, Yongin-si (KR); Kwang-Soo Bae, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 171 days.

(21) Appl. No.: 14/617,742

(22) Filed: Feb. 9, 2015

(65) Prior Publication Data
US 2015/0243944 A1    Aug. 27, 2015

(30) Foreign Application Priority Data
Feb. 24, 2014   (KR) .................. 10-2014-0021431

(51) Int. Cl.
*H01M 2/00* (2006.01)
*H01M 2/10* (2006.01)
*H01M 2/02* (2006.01)

(52) U.S. Cl.
CPC .. *H01M 2/1055* (2013.01); *H01M 2002/0205* (2013.01); *H01M 2200/00* (2013.01); *H01M 2220/30* (2013.01)

(58) Field of Classification Search
CPC ....... H01M 2/10; H01M 2/1015; H01M 2/105
See application file for complete search history.

(56) References Cited

U.S. PATENT DOCUMENTS

| 8,114,537 B2 * | 2/2012 | Kang | .................... H01M 2/105 429/100 |
| 2003/0193313 A1 * | 10/2003 | Takedomi | ........... H01M 2/1077 320/107 |
| 2014/0087236 A1 | 3/2014 | Murayama et al. | |

FOREIGN PATENT DOCUMENTS

| JP | 11-297287 A | 10/1999 |
| JP | 2008-166208 A | 7/2008 |
| JP | 2010-135273 A | 6/2010 |
| JP | 2010-146879 A | 7/2010 |
| JP | 2012-178370 A | 9/2012 |

* cited by examiner

*Primary Examiner* — Matthew Merkling
(74) *Attorney, Agent, or Firm* — Knobbe, Martens, Olson & Bear, LLP

(57) ABSTRACT

A rechargeable battery pack is disclosed. In one aspect, the rechargeable battery pack includes a holder accommodating a plurality of unit cells, wherein each unit cell includes a rechargeable battery, and a case accommodating the holder. The case includes a bottom portion and a cover placed over the bottom portion and the holder. The holder includes a plurality of protrusions that protrude toward the bottom portion and the bottom portion has a plurality grooves defined to respectively correspond to the protrusions.

15 Claims, 6 Drawing Sheets

RECHARGEABLE BATTERY PACK

INCORPORATION BY REFERENCE TO ANY PRIORITY APPLICATIONS

This application claims priority to and the benefit of Korean Patent Application No. 10-2014-0021431 filed in the Korean Intellectual Property Office on Feb. 24, 2014, the entire contents of which are incorporated herein by reference.

BACKGROUND

Field

The described technology generally relates to a rechargeable battery pack used in a power tool.

Description of the Related Technology

Rechargeable batteries include one or more unit cells electrically connected to each other to meet the power requirements of the application for the batteries. The standard rechargeable battery pack includes a plurality of unit cells, a protective circuit module (PCM) that protects the unit cells, and a case housing the unit cells and the protective circuit module.

A typical application for rechargeable battery packs is portable power tools that are generally used outdoors. Rechargeable battery packs designed for such applications need to be protected against mechanical impacts.

SUMMARY OF CERTAIN INVENTIVE ASPECTS

One inventive aspect is a rechargeable battery pack that is protected against impacts as well as having a simplified assembly process.

Another aspect is a rechargeable battery pack including a holder for accommodating a unit cell formed with a rechargeable battery, and a case formed to accommodate the holder in a bottom portion and combine a cover to the bottom portion. The holder is provided with coupling protrusions that protrude toward the bottom portion and the bottom portion is provided with coupling grooves corresponding to the coupling protrusions.

The unit cell may be formed with a cylindrical rechargeable battery and the holder may be provided with a plurality of receiving portions to accommodate a plurality of unit cells.

The receiving portion may include a pair of cylinder portions corresponding to opposite ends of the unit cell and a half-circle portion that interconnects the pair of cylindrical portions and corresponds to one side of the unit cell between the pair of cylinder portions.

The coupling protrusion may protrude toward the bottom portion from the cylinder portion and the coupling groove may be formed in the bottom portion to correspond to the coupling protrusion.

The coupling protrusions may be provided as a pair at both sides of each cylinder portion along an arrangement direction of the receiving portion, based on a diametrical direction of the cylinder portion, and the coupling grooves may be provided as a pair to correspond to the coupling protrusions of each cylinder portion.

The coupling protrusion may include an inclined portion that extends toward a plane of the bottom portion at an angle and a horizontal portion that is caught by the coupling groove when connected to the inclined portion and formed substantially parallel to the bottom portion.

The coupling groove may include a catching protrusion that guides the horizontal portion of the coupling protrusion to be inserted toward an inclined surface and then catches the inserted horizontal portion to prevent the horizontal portion from being separated and a recess space formed at a lower part of the catching protrusion such that the inclined portion of the inserted coupling protrusion and the horizontal portion are folded to retreat from the catching protrusion and are then elastically restored to be caught by the catching protrusion.

The coupling protrusion may be provided at one side of each cylinder portion along a disposition direction of the receiving portion, based on a diametrical direction of the cylinder portion crossing the bottom portion, and the coupling groove may be provided in each cylinder portion to correspond to the coupling protrusion.

The coupling protrusion may include an inclined portion that extends toward a plane of the bottom portion at an angle and a horizontal portion that is connected to the inclined portion and is formed substantially parallel to the bottom portion and the coupling groove may be formed to correspond to the inclined portion and the horizontal portion of the inserted coupling protrusion.

The holder may further include ribs that protrude toward the bottom portion between the receiving portions and are supported by the bottom portion.

The rib may protrude from the half-circle portion between the pair of cylinder portions.

The bottom portion may form coupling grooves corresponding to the ribs and the ribs may be combined to the coupling grooves.

Another aspect is a rechargeable battery pack, comprising a holder accommodating a plurality of unit cells, wherein each unit cell includes a rechargeable battery; and a case accommodating the holder and comprising i) a bottom portion and ii) a cover placed over the bottom portion and the holder, wherein the holder includes a plurality of protrusions that protrude toward the bottom portion and wherein the bottom portion has a plurality grooves defined to respectively correspond to the protrusions.

Each of the unit cells can have a substantially cylindrical shape and the holder can include a plurality of receiving portions respectively configured to accommodate the unit cells. Each of the receiving portions can include i) a pair of cylinder portions formed on opposing ends thereof and ii) a semi-circular portion connecting the pair of cylindrical portions and having a shape corresponding to one side of the unit cell. Each of the protrusions can protrude from one of the cylinder portions and each of the grooves can accommodate the corresponding protrusion. The protrusions can be divided into pairs, wherein the protrusions of each pair are formed on different sides of a corresponding one of the cylinder portions, wherein the receiving portions are arranged in a first direction, and wherein each pair of protrusions is arranged in the first direction. Each of the protrusions can include an inclined portion that extends toward the bottom portion at an angle and a horizontal portion that: i) extends from the inclined portion, ii) is substantially parallel to the bottom portion and iii) is configured to be caught by the corresponding groove.

Each of the grooves can include a catching protrusion configured to: i) guide the horizontal portion of the corresponding protrusion when it is inserted into the groove and ii) catch the inserted horizontal portion of the corresponding protrusion so as to prevent the horizontal portion from being separated therefrom and wherein each of the connective grooves defines a recess space formed below the catching protrusion and wherein each of the protrusions is configured to rotate within the corresponding recess space when being inserted into the groove. Each of the recess spaces can have a substantially semi-circular shape. Each of the protrusions can be formed only at one side of each cylinder portion. Each of the protrusions can include: i) an inclined portion that extends toward the bottom plane at an angle and ii) a horizontal portion that extends from the inclined portion and is substantially parallel to the bottom portion and wherein each of the grooves defines a space having substantially the same shape as that of the corresponding protrusion. The holder can further include a plurality of ribs that protrude toward the bottom portion between the receiving portions and wherein the ribs are supported by the bottom portion. Each of the ribs can protrude from a corresponding one of the semi-circular portions between the corresponding pair of cylinder portions. The bottom portion can further include a plurality of secondary grooves respectively corresponding to the ribs and wherein the secondary grooves accommodate portions of the corresponding ribs. The holder can be configured to be inserted into the bottom portion of the case in a direction substantially perpendicular to the bottom portion. Another aspect is a rechargeable battery pack, comprising a plurality of rechargeable battery cells; a holder housing the rechargeable battery cells and including a plurality of first protrusions; and a case housing the holder and including a bottom portion having a plurality of grooves defined to respectively correspond to the first protrusions, wherein the first protrusions are connected to the bottom portion via the respective grooves.

Each of the first protrusions can include: i) an inclined portion extending toward the bottom portion at an angle and ii) a horizontal portion extending from the inclined portion and formed substantially parallel to the bottom portion. Each of the grooves can include: i) a recess space and ii) a second protrusion formed over the recess space and configured to engage with at least a portion of the corresponding horizontal portion. Each of the second protrusions can be configured to deform the corresponding first protrusion when the first protrusion is inserted into the groove and wherein each of the first protrusions is configured to rotate within the corresponding recess space during the insertion. Each of the recess spaces can have a substantially semi-circular shape. The holder can include a plurality of receiving portions respectively housing the rechargeable battery cells and wherein each of the receiving portions includes i) a pair of cylinder portions formed on opposing ends thereof and ii) a semi-circular portion connecting the pair of cylindrical portions and having a shape corresponding to one side of the rechargeable battery.

According to at least one embodiment, the holder for accommodating the unit cells includes the coupling portions and the case includes the coupling grooves in the bottom portion thereof. Due to the combination of the coupling protrusions to the coupling grooves, the rechargeable battery pack has an improved reliability against impacts.

In addition, the assembly process of the rechargeable battery pack can be simplified.

DETAILED DESCRIPTION OF CERTAIN INVENTIVE EMBODIMENTS

Figure 1:
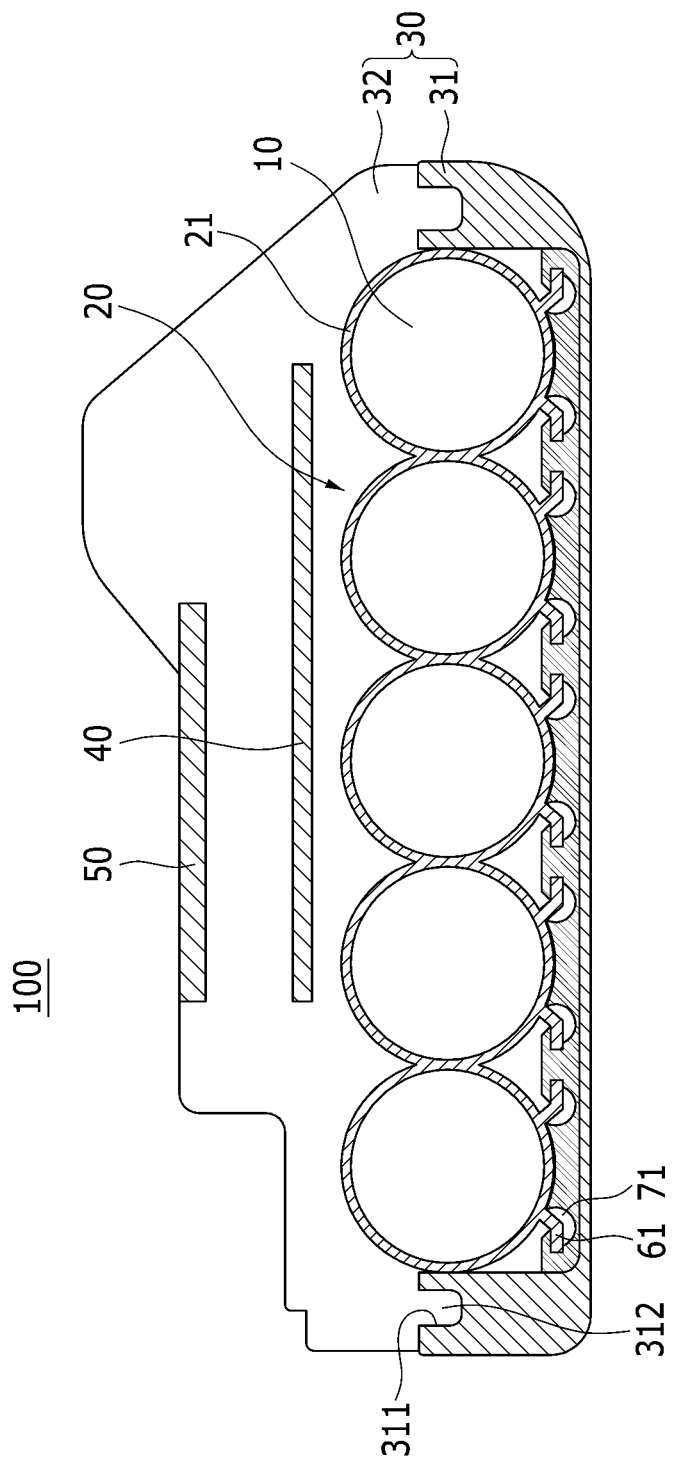
FIG. 1 is a cross-sectional view of a rechargeable battery pack according to a first exemplary embodiment.

In the standard rechargeable battery pack, the unit cells are accommodated in a unit cell holder placed in the case. The unit cells of these battery packs are protected from impacts via a sponge tape attached to an internal portion of the case that fixes the unit cell holder in place. When assembling the standard rechargeable battery pack, the sponge tape must be additionally attached to the case. However, this configuration may not be sufficiently reliable in protecting the unit cells against the external impacts.

The described technology will be described more fully hereinafter with reference to the accompanying drawings, in which exemplary embodiments are shown. As those skilled in the art would realize, the described embodiments may be modified in various different ways, all without departing from the spirit or scope of the described technology. The drawings and description are to be regarded as illustrative in nature and not restrictive. Like reference numerals designate like elements throughout the specification. The term "substantially" as used in this disclosure can include the meanings of completely, almost completely, or to any significant degree in some applications and in accordance with the understanding of those skilled in the art.

FIG. 1 is a cross-sectional view of a rechargeable battery pack 100 according to a first exemplary embodiment.

Referring to FIG. 1, the rechargeable battery pack 100 includes a holder 20 for accommodating unit cells 10, each including at least one rechargeable battery, and a case 30 for accommodating and supporting the holder 20. In addition, the rechargeable battery pack 100 further includes a protective circuit module 40 that is electrically connected to the unit cells 10 to protect them and a terminal 50 that can be connected to a power tool (not shown) to supply power thereto.

In some embodiments, the unit cell 10 is a cylindrical rechargeable battery that is capable of being repeatedly charged and discharged.

Though not illustrated, each unit cell includes an electrode assembly formed by layering positive and negative electrodes with a separator interposed therebetween and then spirally winding them together. The electrode assembly also includes a cell case for accommodating an electrolyte solution and the electrode assembly, and a cap assembly (not shown) electrically connected to the electrode assembly and forming an air-tight seal with an open end of the cell case.

The holder 20 accommodates the unit cells 10, and in the first exemplary embodiment, is a combination of five receiving portions 21 and accommodates five unit cells 10. Though not illustrated, the holder may be formed such that it includes a various number of receiving portions to accommodate a corresponding number of unit cells.

In addition, the receiving portions 21 each have a cylindrical structure corresponding to the shape of the unit cells 10 that are accommodated therein. Though not illustrated, in embodiments where the accommodating the unit cells are rechargeable batteries having a substantially prismatic shape, the receiving portion has a corresponding prismatic structure.

Figure 2:
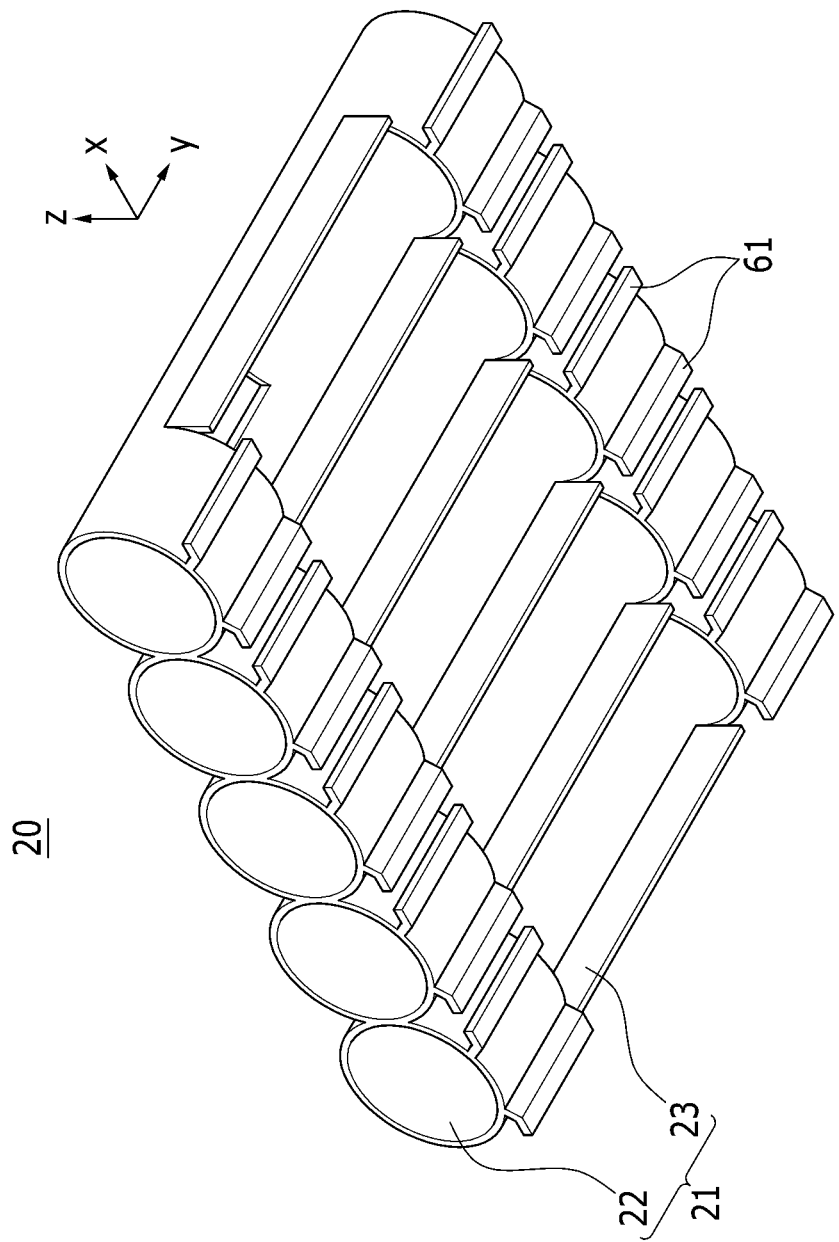
FIG. 2 is a perspective view of the holder of FIG. 1.

FIG. 2 is a perspective view of the holder 20 of FIG. 1.

Referring to FIG. 2, the receiving portion 21 of the holder 20 includes a pair of cylinder portions 22 on opposing ends of the unit cell 10 and a half-circle portion or semi-circular portion 23 that interconnects the pair of cylinder portions 22 in the length direction of the unit cell 10 (y-axis direction).

The half-circle portion 23 has a shape corresponding to one side of the unit cell 10 between the pair of cylinder portions 22 and exposes the remaining portion thereof. That is, the half-circle portion 23 supports an upper portion of the unit cell 10 in the z-axis direction while exposing a lower portion of the unit cell 10 to cool the unit cell 10.

Referring back to FIG. 1, the case 30 includes a bottom portion 31 for accommodating the holder 20 and a cover 32 combined with the bottom portion 31 and covering the holder 20. Together with the holder 20, the case 30 determines how many unit cells 10 can be accommodated therein. For example, the bottom portion 31 includes a groove 311 and the cover 32 includes a protrusion 312 corresponding to the groove 311. By combining the protrusion 312 with the groove 311, the bottom portion 31 and the cover 32 form the case 30 in which the unit cells 10 and the holder 20 are placed.

In addition, the protective circuit module 40 is arranged above the holder 20 and is covered with the cover 32 to be protected from the environment. The terminal 50 is formed on an exterior of the cover 32 to be electrically connected to the power tool when the rechargeable battery pack 100 is attached thereto. The terminal 50 is separated from the power tool when the rechargeable battery pack 100 is separated from the power tool.

Furthermore, the holder 20 includes coupling protrusions or protrusions 61 that protrude toward the bottom portion 31 and the bottom portion 31 includes coupling grooves or grooves 71 corresponding to the coupling protrusions 61. When the holder 20 is placed inside the case 30, the coupling protrusions 61 of the holder 20 are connected to the coupling grooves 71 of the bottom portion 31.

The coupling protrusions 61 and the coupling grooves 71 increase the connection strength between the holder 20 and the case 30 when compared to a sponge tape connection. Accordingly, when the rechargeable battery pack 100 is subjected to external impact, the impact transferred from the bottom portion 31 to the holder 20 can be absorbed and reduced between the coupling grooves 71 and the coupling protrusions 61. That is, the holder 20 including the coupling protrusions 61 has a reinforced mechanical strength due to the connection between the coupling protrusions 61 and coupling grooves 71, thereby enhancing its reliability in protecting against impacts delivered to the case 30.

Figure 3:
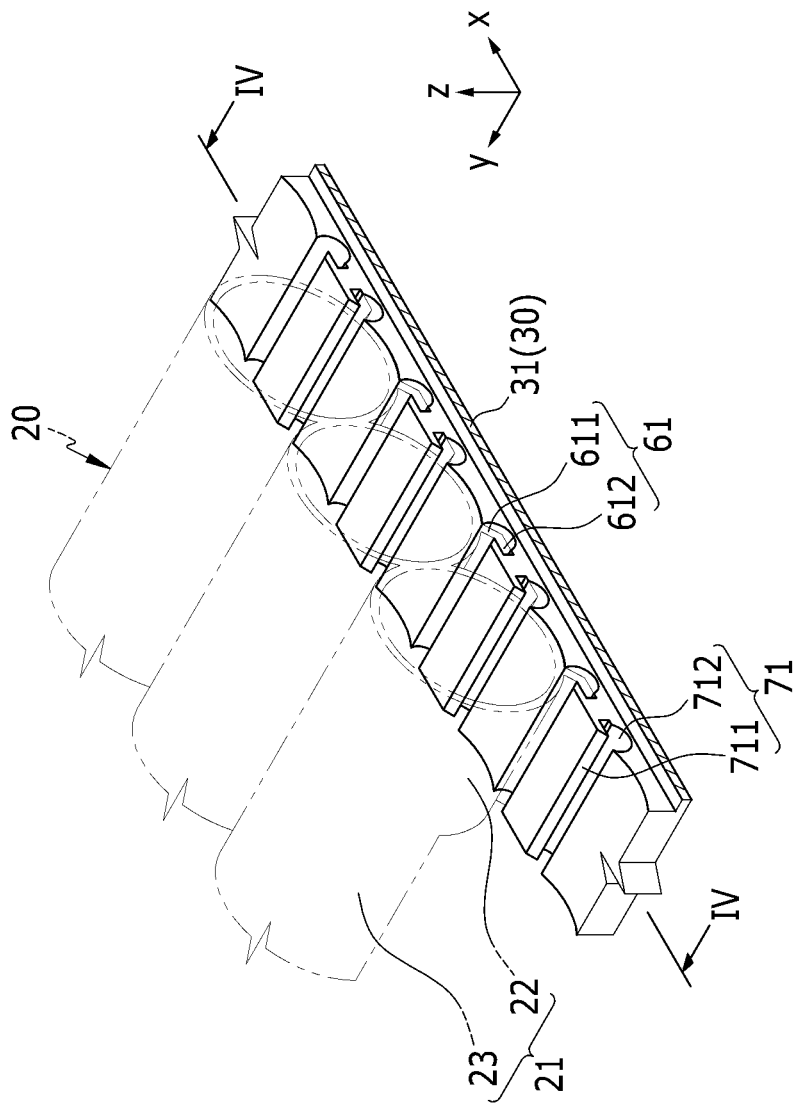
FIG. 3 is a partial perspective view of the holder combined with the case of FIG. 1.
Figure 4:
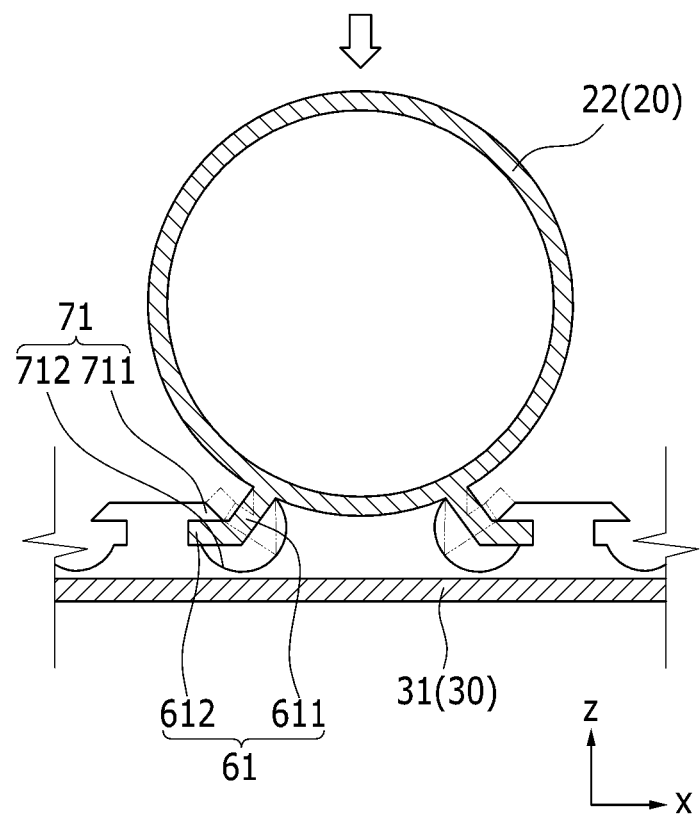
FIG. 4 is a cross-sectional view of FIG. 3 taken along the line IV-IV.

FIG. 3 is a partial perspective view of the holder 20 combined with the case 30 of FIG. 1 and FIG. 4 is a cross-sectional view of FIG. 3 taken along the line IV-IV.

Referring to FIGS. 3 and 4, the coupling protrusions 61 of the holder 20 protrude from the cylinder portions 22 toward the bottom portion 31 of the case 30 and the coupling grooves 71 are formed in the bottom portion 31 to respectively correspond to the coupling protrusions 61.

The coupling protrusions 61 are formed in pairs at lower opposing sides of each cylinder portion 22 in the arrangement direction of the receiving portion 21 (x-axis direction), based on a diametrical direction of the cylinder portion 22 (z-axis direction) crossing a plane of the bottom portion 31 (x-y plane). In other words, the receiving portions 21 are arranged in a direction substantially aligned with their diameters. The coupling grooves 71 are also formed in pairs at below each cylinder portion 22 to correspond to the coupling protrusions 61.

For example, each coupling protrusion 61 includes an inclined portion 611 that extends from the cylinder portion 22 at an angle toward the plane of the bottom portion 31 (x-y plane). Each coupling protrusion 61 also includes a horizontal portion 612 that can be caught by the corresponding coupling groove 71 and is connected to the inclined portion 611 at a predetermined angle. The horizontal portion 612 is also substantially parallel to the bottom portion 31.

In some embodiments, each coupling groove 71 includes an upper catching protrusion 711 at an upper portion thereof, and a recess space 712 at a lower portion thereof. The catching protrusion 711 forms an upper portion of the coupling groove 71 and guides insertion of the horizontal portion 612 of the coupling protrusion 61 when the coupling protrusion 61 is inserted downwardly from above (arrow direction of FIG. 4). The inserted horizontal portion 612 is caught by the catching protrusion 711 to prevent the horizontal portion 612 of the coupling protrusion 61 from being separated in the z-axis direction after the insertion has been completed. In some embodiments, as shown in FIG. 4, each of the recess spaces 712 has a substantially semi-circular shape which provides space for the connection between the inclined portion 611 and horizontal portion 612 to rotate when the coupling protrusion 61 is inserted.

The recess space 712 is formed under the catching protrusion 711 and forces the inclined portion 611 and the horizontal portion 612 to be bent away from the catching protrusion 711 when folded (imaginary line state of FIG. 4), and then to be elastically restored in its original shape so as to be caught by the catching protrusion 711. That is, when the horizontal portion 612 reaches the inside of the recess space 712, the horizontal portion 612 and the inclined portion 611 are unfolded inside of the recess space 712 such that the horizontal portion 612 is caught by the catching protrusion 711.

As such, the recess space 712 provides space in which the coupling protrusion 61 can be folded and then unfolded. Thus, according to at least one embodiment, the holder 20 is only be stably fixed to the bottom portion 31 but also elastically supported on the bottom portion 31 by the connective structure of the coupling protrusion 61 and the coupling groove 71.

Since the external impacts applied to the bottom portion 31 are absorbed or reduced in the coupling protrusions 61 and the coupling grooves 71, the holder 20 can stably maintain the structure for accommodating the unit cells 10.

Various exemplary embodiments will now be described. Descriptions of the same configurations and components as described above will be omitted and only those configurations and components different from the previous embodiment will be described in detail.

Figure 5:
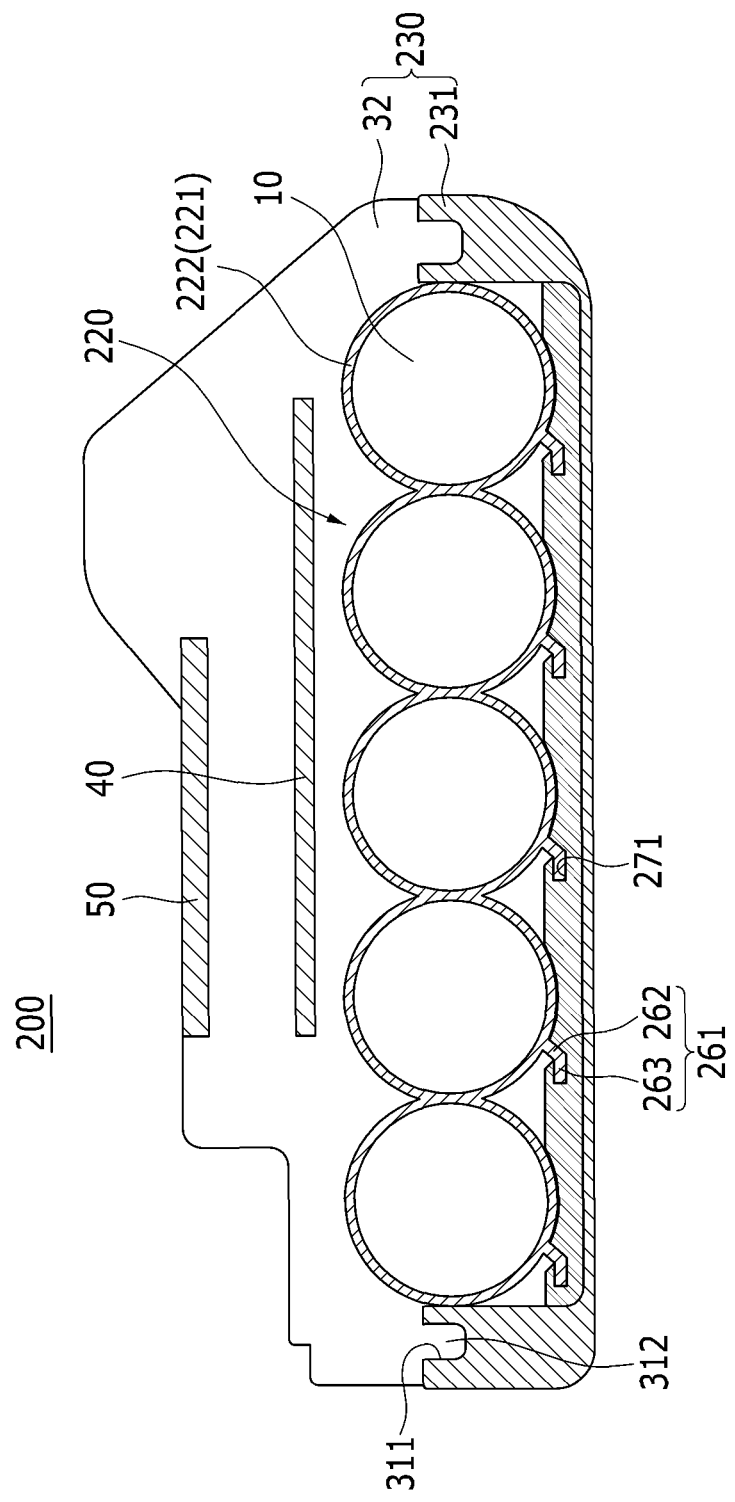
FIG. 5 is a cross-sectional view of a rechargeable battery pack according to a second exemplary embodiment.

FIG. 5 is a cross-sectional view of a rechargeable battery pack 200 according to a second exemplary embodiment.

Referring to FIG. 5, the holder 220 includes a plurality of coupling protrusions 261 provided at a lower portion of each cylinder portion 222 along an arrangement direction of the receiving portion 221 (x-axis direction), based on a diametrical direction of the cylinder portion 222 (z-axis direction) crossing a plane of a bottom portion 231 (x-y plane).

A coupling groove 271 is provided at the lower portion of each cylinder portion 222 to correspond to the coupling protrusions 261. For example, the coupling protrusions 261 each include an inclined portion 262 that extends from the cylinder portion 222 at an angle toward a plane formed along the bottom portion 231 (x-y plane). Each coupling protrusion also includes a horizontal portion 263 that can be caught by the coupling groove 271 and is connected to the inclined portion 262 at a predetermined angle. The horizontal portion 263 is also substantially parallel to the bottom portion 231.

In some embodiments, each coupling groove 271 is formed to correspond to the inclined portion 262 and the horizontal portion 263 of the inserted coupling protrusion 261. Thus, when the holder 220 is inserted into the case 230, the coupling protrusion 261 is inserted into the coupling groove 271 and rotates along the coupling groove 271 during insertion.

The holder 220 of the second exemplary embodiment includes a plurality of receiving portions 221, each of which is provided with one coupling protrusion 261, thereby allowing easier insertion of the coupling protrusions 261 into the corresponding coupling grooves 271 of the bottom portion 231. That is, the coupling grooves 271 of the second exemplary embodiment have a simpler structure than the coupling grooves 71 of the first exemplary embodiment.

Figure 6:
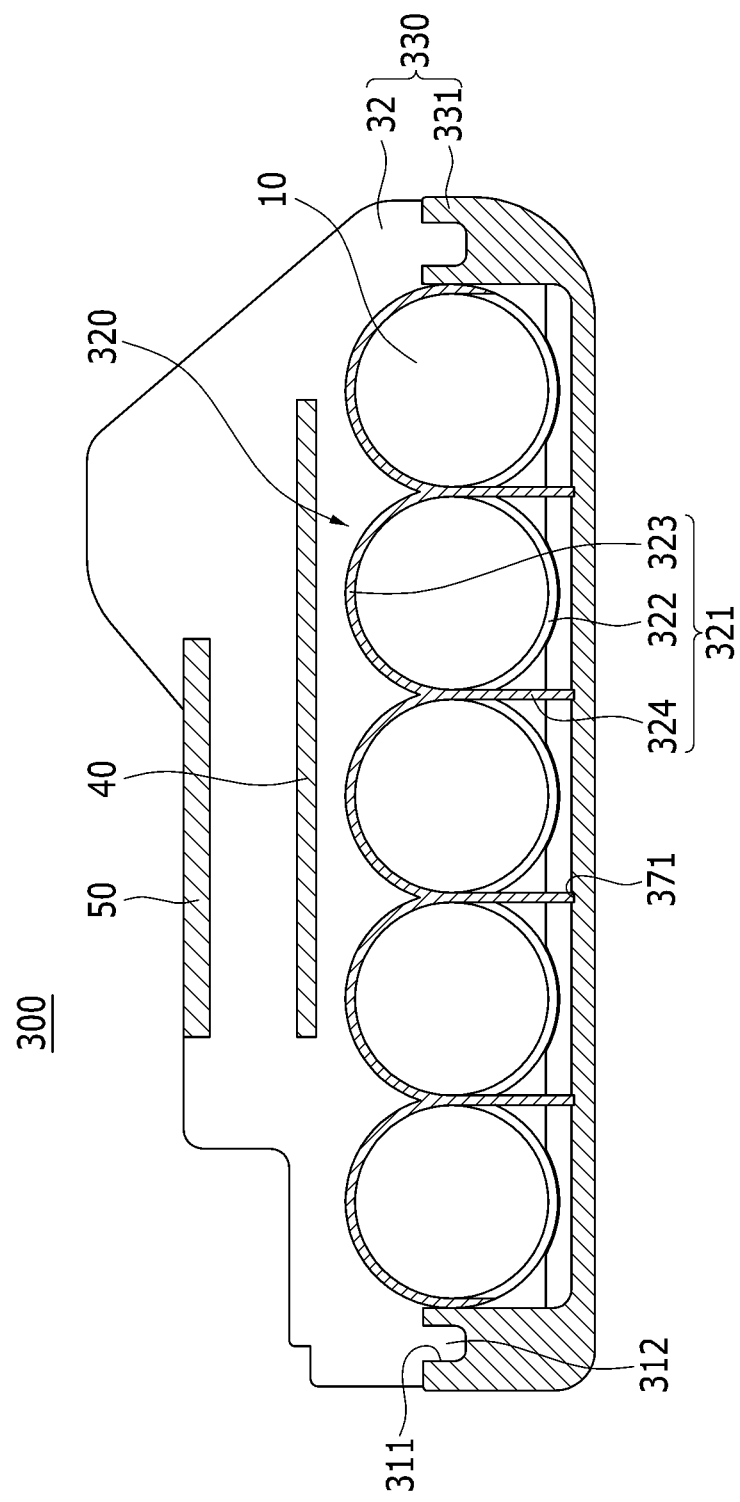
FIG. 6 is a cross-sectional view of a rechargeable battery pack according to a third exemplary embodiment.

FIG. 6 is a cross-sectional view of a rechargeable battery pack 300 according to a third exemplary embodiment.

Referring to FIG. 6, the holder 320 further includes ribs 324 that protrude toward the bottom portion 331 of the case 330 between neighboring receiving portions 321 which are supported by the bottom portion 331. The rib 324 protrudes toward the bottom portion 231 from a half-circle portion 323 of the cylinder portions 322 between adjacent cylinder portions 322.

The bottom portion 331 includes coupling grooves or secondary grooves 371 corresponding to the ribs 324. When the holder 320 is inserted into the case 330, the rib 324 of the holder 320 is inserted into the coupling groove 371 of the bottom portion 331. For example, the rib 324 may be forcedly combined with the coupling groove 371.

That is, the coupling groove 371 of the third exemplary embodiment has a simpler structure than the respective coupling grooves 71 and 271 of the first and second exemplary embodiments.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A rechargeable battery pack, comprising:
a holder accommodating a plurality of unit cells, wherein each unit cell includes a rechargeable battery; and
a case accommodating the holder and comprising i) a bottom portion and ii) a cover placed over the bottom portion and the holder,
wherein the holder includes a plurality of protrusions that protrude toward the bottom portion,
wherein the bottom portion has a plurality grooves defined to respectively correspond to the protrusions,
wherein each of the unit cells has a substantially cylindrical shape,
wherein the holder includes a plurality of receiving portions respectively configured to accommodate the unit cells,
wherein the protrusions are divided into pairs,
wherein the protrusions of each pair are formed on different sides of a corresponding one of the receiving portions,
wherein the receiving portions are arranged in a first direction, and
wherein each pair of protrusions is arranged in the first direction.
2. The rechargeable battery pack of claim 1, wherein each of the receiving portions includes i) a pair of cylinder portions formed on opposing ends thereof and ii) a semi-circular portion connecting the pair of cylindrical portions and having a shape corresponding to one side of the unit cell.
3. The rechargeable battery pack of claim 2, wherein each of the protrusions protrudes from one of the cylinder portions and wherein each of the grooves accommodates the corresponding protrusion.
4. The rechargeable battery pack of claim 1, wherein each of the protrusions includes an inclined portion that extends toward the bottom portion at an angle and a horizontal portion that: i) extends from the inclined portion, ii) is substantially parallel to the bottom portion and iii) is configured to be caught by the corresponding groove.
5. The rechargeable battery pack of claim 4, wherein each of the grooves includes a catching protrusion configured to: i) guide the horizontal portion of the corresponding protrusion when it is inserted into the groove and ii) catch the inserted horizontal portion of the corresponding protrusion so as to prevent the horizontal portion from being separated therefrom and wherein each of the connective grooves defines a recess space formed below the catching protrusion and wherein each of the protrusions is configured to rotate within the corresponding recess space when being inserted into the groove.
6. The rechargeable battery of claim 5, wherein each of the recess spaces has a substantially semi-circular shape.
7. A rechargeable battery pack, comprising:
a holder accommodating a plurality of unit cells, wherein each unit cell includes a rechargeable battery; and
a case accommodating the holder and comprising i) a bottom portion and ii) a cover placed over the bottom portion and the holder,
wherein the holder includes a plurality of protrusions that protrude toward the bottom portion,
wherein the bottom portion has a plurality grooves defined to respectively correspond to the protrusions,
wherein each of the protrusions is formed only at one side of each cylinder portion,
wherein each of the protrusions includes: i) an inclined portion that extends toward the bottom portion at an angle and ii) a horizontal portion that extends from the inclined portion and is substantially parallel to the bottom portion, and
wherein each of the grooves defines a space having substantially the same shape as that of the corresponding protrusion.
8. A rechargeable battery pack, comprising:
a holder accommodating a plurality of unit cells, wherein each unit cell includes a rechargeable battery; and
a case accommodating the holder and comprising i) a bottom portion and ii) a cover placed over the bottom portion and the holder,
wherein the holder includes a plurality of protrusions that protrude toward the bottom portion,
wherein the bottom portion has a plurality grooves defined to respectively correspond to the protrusions,
wherein each of the unit cells has a substantially cylindrical shape,
wherein the holder includes a plurality of receiving portions respectively configured to accommodate the unit cells, wherein each of the receiving portions includes i) a pair of cylinder portions formed on opposing ends thereof and ii) a semi-circular portion connecting the pair of cylindrical portions and having a shape corresponding to one side of the unit cell, wherein the holder further includes a plurality of ribs that protrude toward the bottom portion between the receiving portions and wherein the ribs are supported by the bottom portion, and wherein each of the ribs protrudes from a corresponding one of the semi-circular portions between the corresponding pair of cylinder portions.

9. The rechargeable battery pack of claim 8, wherein the bottom portion further includes a plurality of secondary grooves respectively corresponding to the ribs and wherein the secondary grooves accommodate portions of the corresponding ribs.

10. The rechargeable battery pack of claim 1, wherein the holder is configured to be inserted into the bottom portion of the case in a direction substantially perpendicular to the bottom portion.

11. A rechargeable battery pack, comprising:
a plurality of rechargeable battery cells;
a holder housing the rechargeable battery cells and including a plurality of first protrusions; and
a case housing the holder and including a bottom portion having a plurality of grooves defined to respectively correspond to the first protrusions,
wherein the first protrusions are connected to the bottom portion via the respective grooves, and
wherein each of the first protrusions includes: i) an inclined portion extending toward the bottom portion at an angle and ii) a horizontal portion extending from the inclined portion and formed substantially parallel to the bottom portion.

12. The rechargeable battery pack of claim 11, wherein each of the grooves includes: i) a recess space and ii) a second protrusion formed over the recess space and configured to engage with at least a portion of the corresponding horizontal portion.

13. The rechargeable battery pack of claim 12, wherein each of the second protrusions is configured to deform the corresponding first protrusion when the first protrusion is inserted into the groove and wherein each of the first protrusions is configured to rotate within the corresponding recess space during the insertion.

14. The rechargeable battery pack of claim 12, wherein each of the recess spaces has a substantially semi-circular shape.

15. The rechargeable battery pack of claim 11, wherein the holder includes a plurality of receiving portions respectively housing the rechargeable battery cells and wherein each of the receiving portions includes i) a pair of cylinder portions formed on opposing ends thereof and ii) a semi-circular portion connecting the pair of cylindrical portions and having a shape corresponding to one side of the rechargeable battery.

* * * * *